(12) United States Patent
Tsukamoto et al.

(10) Patent No.: US 11,040,743 B2
(45) Date of Patent: Jun. 22, 2021

(54) REAR VEHICLE-BODY STRUCTURE

(71) Applicant: MAZDA MOTOR CORPORATION, Hiroshima (JP)

(72) Inventors: Hideyuki Tsukamoto, Hiroshima (JP); Ken Yamada, Hatsukaichi (JP); Akiyoshi Masuda, Aki-gun (JP); Hidenori Matsuoka, Hiroshima (JP); Koji Matsushita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 227 days.

(21) Appl. No.: 16/292,780

(22) Filed: Mar. 5, 2019

(65) Prior Publication Data

US 2019/0291787 A1 Sep. 26, 2019

(30) Foreign Application Priority Data

Mar. 20, 2018 (JP) .............................. JP2018-053190

(51) Int. Cl.
*B62D 25/20* (2006.01)
*B62D 27/02* (2006.01)
(52) U.S. Cl.
CPC ..... *B62D 25/2027* (2013.01); *B62D 25/2036* (2013.01); *B62D 27/02* (2013.01)
(58) Field of Classification Search
CPC . B62D 25/2027; B62D 27/02; B62D 25/2036
USPC ................... 296/204, 193.07, 29, 203.01, 30
See application file for complete search history.

(56) References Cited

U.S. PATENT DOCUMENTS

| 7,281,756 | B2* | 10/2007 | Fukushi | ............... | B62D 25/084 |
| | | | | | 296/203.04 |
| 2009/0195032 | A1* | 8/2009 | Yamaguchi | ........ | B62D 25/2027 |
| | | | | | 296/203.04 |
| 2016/0129747 | A1* | 5/2016 | Mildner | ............... | B60G 15/068 |
| | | | | | 280/124.155 |

FOREIGN PATENT DOCUMENTS

JP 2003-137140 A 5/2003

* cited by examiner

*Primary Examiner* — D Glenn Dayoan
*Assistant Examiner* — E Turner Hicks
(74) *Attorney, Agent, or Firm* — Studebaker & Brackett PC

(57) ABSTRACT

A recessed portion is formed at a frame member provided at a rear portion of a vehicle body and having a closed cross section extending in a vehicle longitudinal direction such that a part of a lower face of the frame member is recessed upwardly, where a damper of a rear suspension is inserted and fixed. A front portion of the frame member is joined to a side sill extending in the vehicle longitudinal direction at a position offset outwardly in a vehicle width direction from the frame member. Branch-shaped closed cross sections branching off from the closed cross section inwardly and outwardly relative to the damper are formed at a position corresponding to the recessed portion of the frame member. A portion of the frame member located at the above-described position is wide outwardly.

12 Claims, 12 Drawing Sheets

PRIOR ART

REAR VEHICLE-BODY STRUCTURE

BACKGROUND OF THE INVENTION

The present invention relates to a rear vehicle-body structure which comprises a damper support portion to support a rear suspension damper and a frame member extending in a vehicle longitudinal direction, such as a rear side frame, wherein the frame member is configured to serve as the damper support portion.

As exemplified by Japanese Patent Laid-Open Publication No. 2003-137140, a rear vehicle-body structure in which a damper support portion (a suspension attachment portion (33)) to support a rear suspension damper (hereafter, referred to as a "damper") is provided at a position located on an outward side, in a vehicle width direction, of a frame member (a rear side frame (7)) and on an inward side, in the vehicle width direction, of a wheel house inner (19) is known.

Herein, differently from the above-described structure of the patent document where the frame member, the damper support portion, and the wheel house inner are arranged along the vehicle width direction, it may be considered that a recessed portion 150 is formed at a frame member 160, wherein the recessed portion 150 is configured such that a lower face of the frame member 160 is recessed upwardly, and a damper (not illustrated) is inserted, from below, into and supported at a damper insertion hole 151 which is formed at a recessed bottom of the recessed portion 150, similarly to a rear vehicle-body structure 100 illustrated in FIG. 11 and FIG. 12 which shows a sectional view taken along line D-D of FIG. 11.

Herein, in a structure where a front portion of the frame member is joined to a rear portion of a side sill which extends in the vehicle longitudinal direction at a position which is spaced outwardly, in the vehicle width direction, apart from the frame member (at an offset position), smooth load transmission from the frame member to the side sill may become difficult when an obstacle collides with a rear portion of a vehicle, in particular, (in a vehicle rear collision) in a case where the distance, in the vehicle width direction, between the frame member and the side sill (an offset amount) becomes greater.

Specifically, there is a concern that the vehicle may have deformation in the vehicle rear collision in such a manner that an overlapping amount, in the vehicle longitudinal direction, of the frame member and the side sill which both extend in the vehicle longitudinal direction becomes greater, that is, the frame member and the side sill form a Z shape in a plan view. Accordingly, some countermeasures, such as making the plate thickness of the frame member or the side sill properly thick, may be required. In this case, however, another problem that the structure weight improperly increases may occur.

Herein, in the frame member which is provided with the recessed portion to support the damper, the layout where the frame member is necessarily arrange at a position which is offset inwardly in the vehicle width direction from the side sill (i.e., an axial center along a longitudinal direction of the frame member is necessarily located inwardly in the vehicle width direction relative to the side sill) is needed, so that some countermeasures for the above-described concern may need to be taken.

SUMMARY OF THE INVENTION

The present invention has been devised in view of the above-described matter, and an object of the present invention is to provide a rear vehicle-body structure which can efficiently transmit the load from the frame member to the side sill in the vehicle rear collision in the structure where the side sill is arranged at the position which is offset outwardly in the vehicle width direction from the frame member.

The present invention is a rear vehicle-body structure, comprising a frame member provided at a rear portion of a vehicle body and having a closed cross section extending in a vehicle longitudinal direction, a side sill extending in the vehicle longitudinal direction at a position which is offset outwardly in a vehicle width direction from the frame member, to which a front portion of the frame member is joined, a recessed portion formed at the frame member, wherein the recessed portion is configured such that a lower face of the frame member is recessed upwardly, and a damper of a rear suspension is inserted into and fixed to the recessed portion, and inward-side and outward-side closed cross sections formed inside the frame member at a longitudinal position corresponding to the recessed portion, wherein the inward-side and outward-side closed cross sections are configured to branch off from the closed cross section of the frame member inwardly and outwardly in the vehicle width direction relative to the damper, wherein the frame member is configured such that a portion of the frame member which is located at the longitudinal position corresponding to the recessed portion is wide outwardly in the vehicle width direction.

According to the present invention, even if the side sill is arranged at the position which is offset outwardly in the vehicle width direction from the frame member, the center of figure of the frame member can be positioned outwardly in the vehicle width direction, i.e., can be moved toward the side sill, by configuring the frame member such that the portion of the frame member which is located at the longitudinal position corresponding to the recessed portion is wide outwardly in the vehicle width direction. Thereby, the rear-collision load can be efficiently transmitted from the frame member to the side sill in the rear collision.

In an embodiment of the present invention, the recced portion is formed at a center, in the vehicle width direction, of the wide portion of the frame member located at the position corresponding to the recessed portion.

According to this embodiment, in the frame member which is provided with the recessed portion as the damper support portion, the damper-support rigidity and the transmission performance of the load transmitted from the frame member to the side sill in the rear collision can be compatibly attained.

In another embodiment of the present invention, the frame member is provided with an outer panel which constitutes an outward face, in the vehicle width direction, of the outward-side closed cross section, the outer panel forwardly extends continuously from the position corresponding to the recessed portion so as to constitute an outward face, in the vehicle width direction, of the closed cross section of the frame member which is located in front of the position corresponding to the recessed portion, and a front end of the outer panel is joined to the side sill.

According to this embodiment, since the frame member is provided with the outer panel which extends continuously from the above-described recessed-portion corresponding position to its joint portion to the side sill, even in a case where a portion of the frame member which is positioned between its joint portion to the side sill and the recessed-portion corresponding position is configured to have a narrower width than the recessed-portion corresponding position, the rear-collision load can be efficiently transmitted, along the outer panel, from the recessed-portion corresponding position to the joint portion to the side sill in the rear collision, without being concentrated on the above-described narrow portion.

In another embodiment of the present invention, a ridgeline which extends continuously over a range from the position corresponding to the recessed portion to a joint portion of the outer panel to the side sill is formed at the outer panel.

According to this embodiment, by forming the above-described ridgeline at the outer panel, even if the portion of the frame member between the recessed-portion corresponding position and the joint portion to the side sill is narrower than the recessed-portion corresponding position, the strength of the above-described narrow portion can be secured properly, so that the rear-collision load can be efficiently transmitted forwardly to the side sill along the ridgeline formed at the outer panel of the frame member in the rear collision.

In another embodiment of the present invention, a suspension-component attachment portion where a suspension component of the rear suspension is attached is provided between a joint portion of the frame member to the side sill and the position corresponding to the recessed portion.

Herein, the front-side suspension-component attachment portion is generally configured to have the higher rigidity than any other part of the frame member for proper attachment of the suspension component (such as a trailing arm or a suspension cross member). Therefore, according to this embodiment, by providing the suspension-component attachment portion between the joint portion of the frame member to the side sill and the above-described recessed-portion corresponding position, the strength of the above-described narrow portion can be secured properly.

Accordingly, even if the portion of the frame member between the joint portion to the side sill and the recessed-portion corresponding position is relatively narrow, the rear-collision load can be efficiently transmitted forwardly to the side sill, without being concentrated on the above-described narrow portion.

Other features, aspects, and advantages of the present invention will become apparent from the following description which refers to the accompanying drawings.

DETAILED DESCRIPTION OF THE INVENTION

Figure 1:
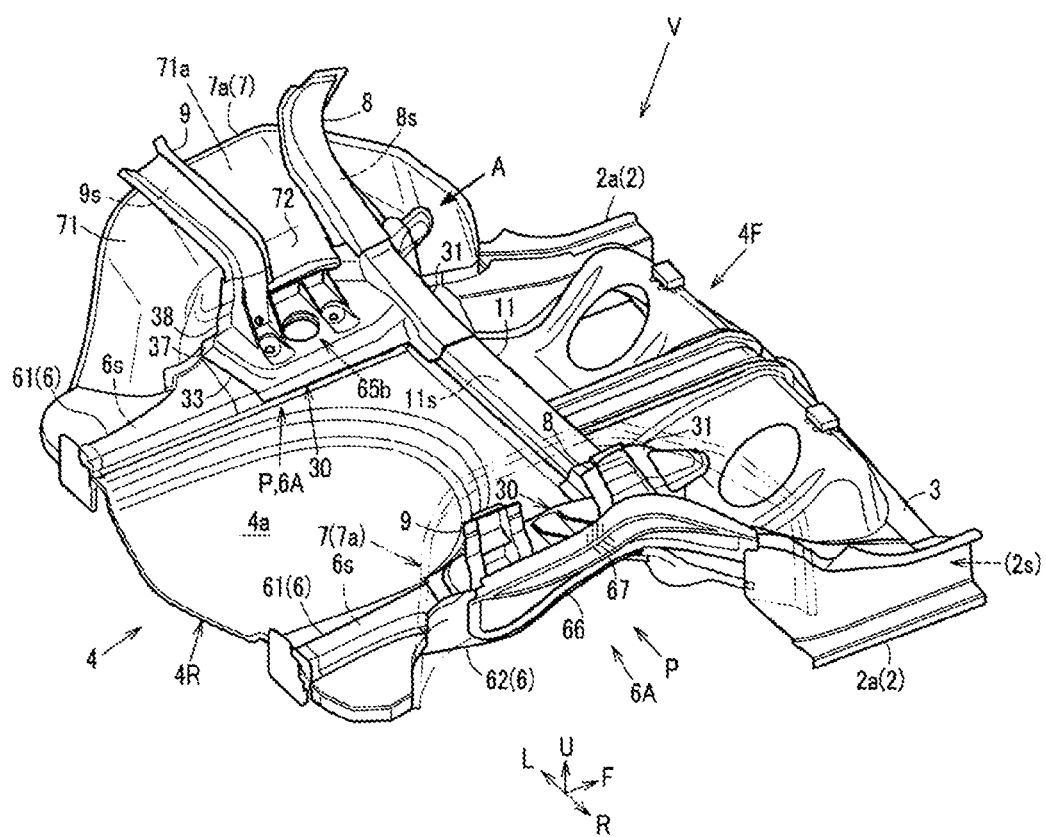
FIG. 1 is a perspective view of a rear vehicle-body structure of a present embodiment.

Hereafter, an embodiment of the present invention will be specifically described referring to the drawings.

In the figures, an arrow F shows a vehicle front side, an arrow R shows a vehicle right side, an arrow L shows a vehicle left side, an arrow U shows a vehicle upper side, an arrow out shows an outward side in a vehicle width direction, and an arrow in shows an inward side in the vehicle width direction.

Figure 2:
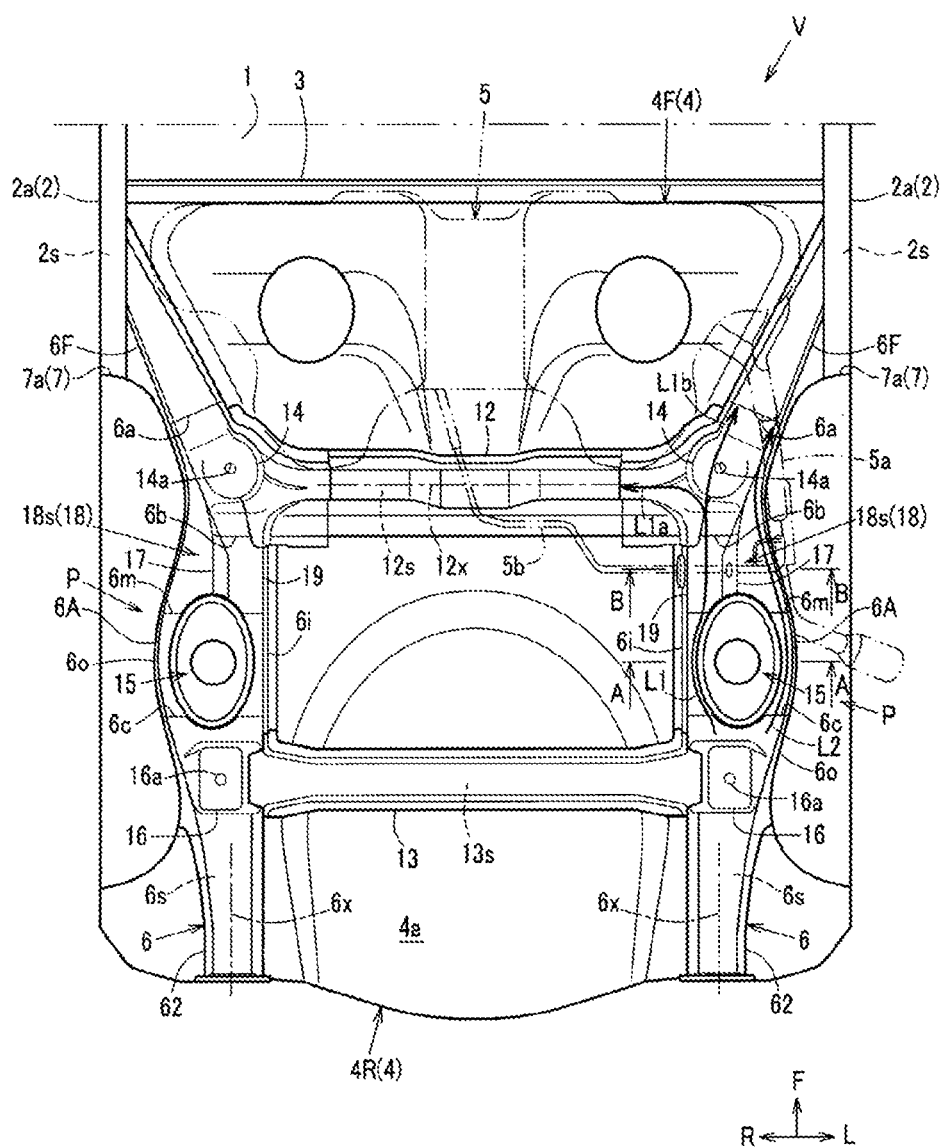
FIG. 2 is a bottom view of the rear vehicle-body structure of the present embodiment.

FIGS. 1 and 2 show a rear vehicle-body structure V of the present embodiment of the present invention, and a basic structure of the rear vehicle-body structure V of the present embodiment will be described referring to FIGS. 1 and 2 primarily first.

In a vehicle body of an automotive vehicle shown in FIG. 2, a floor panel 1 which constitutes a floor face of a cabin is provided, and side sills 2 as vehicle-body reinforcing members are fixedly joined to both sides of the floor panel 1. Herein, each of the side sills 2 comprises a side sill inner 2a and a side sill outer (not illustrated) and has a closed cross section 2s extending in a vehicle longitudinal direction.

As shown in FIGS. 1 and 2, a rear floor panel 4 is integrally connected to a rear portion of the floor panel 1 which constitutes a vehicle-body rear floor via a kick-up portion 3 which is configured to rise upwardly, and rear side frames 6 (hereafter, referred to as the "frame members 6") which extend in the vehicle longitudinal direction are provided at both sides of the rear floor panel 4.

As shown in FIG. 2, a fuel tank 5 is arranged below a front portion 4F ((hereafter, referred to as the "rear floor front portion 4F") of the rear floor panel 4. The fuel tank 5 is protected by an insulator, not illustrated.

As shown in the same figure, the fuel tank 5 is equipped with a fuel pipe 5a (filler pipe 5a) for supplying fuel into the fuel tank 5 from a fuel supply port (not illustrated) positioned inside a filler rid (not illustrated) provided at an a left-side face of a rear portion of the vehicle body and a breather pipe 5b as a passage of evaporated fuel. The fuel pipe 5a and the breather pipe 5b are arranged at the vehicle left side such that they extend from below the rear floor panel 4 of the vehicle across the left-side frame member 6.

As shown in FIG. 1, at a rear portion 4R of the rear floor panel 4 (hereafter, referred to as the "rear-floor rear portion 4R") is integrally formed a concave portion 4a which serves as a spare tire pan which is configured such that a middle part, in the vehicle width direction, of the rear-floor rear portion 4R is concaved downwardly or any other components.

The above-described frame member 6 is constituted as a vehicle-body side-portion rigidity member which is configured to have a closed cross section 6s extending in the vehicle longitudinal direction from the kick-up portion 3 to a rear end of the rear floor panel 4. A front end of the frame member 6 is connected to a rear portion of the side sill 2.

As shown in FIGS. 1 and 2, the frame member 6 comprises a frame member upper 61 (see FIG. 1) which has an upwardly-protruding hat-shaped cross section over a whole part of the vehicle longitudinal direction, a frame member lower 62 (see FIG. 2) which has a downwardly-protruding hat-shaped cross section, and others. The frame member upper 61 and the frame member lower 62 include flange portions 61*a*, 62*a* at respective inward ends, in the vehicle width direction, of these members 61, 62 (see FIGS. 5 and 6), and an outward end portion 4*b*, in the vehicle width direction, of the rear floor panel 4 which is interposed between these members 61, 62 is welded together with the members 61, 62 such that a three-layer joining is provided (see the same figures).

As shown in FIGS. 1 and 2, a rear wheel house 7 is provided on the outward side, in the vehicle width direction, of the frame member 6. The rear wheel house 7 is formed by joining a rear wheel house outer, not illustrated, and a rear wheel house inner 7*a* (hereafter, referred to as the "wheel house inner 7*a*").

As shown in FIG. 1, front-and-rear side braces 8, 9 to reinforce the wheel house inner 7*a* are joined to the wheel house inner 7*a* from respective inward sides, in the vehicle width direction, of the side braces 8, 9. Closed cross sections 8*s*, 9*s* are respectively formed between the front-and-rear side braces 8, 9 and the wheel house inner 7*a*.

As shown in the same figure, the front-and-rear side braces 8, 9 are arranged in front and back of a top portion 71*a* of an arch portion 71 of the wheel house inner 7*a* which is formed in an arch shape in a side view, and these braces 8, 9 respectively extend upwardly from a middle position, in a vertical direction, of a vertical wall portion 72 of the wheel house inner 7*a*.

Figure 11:
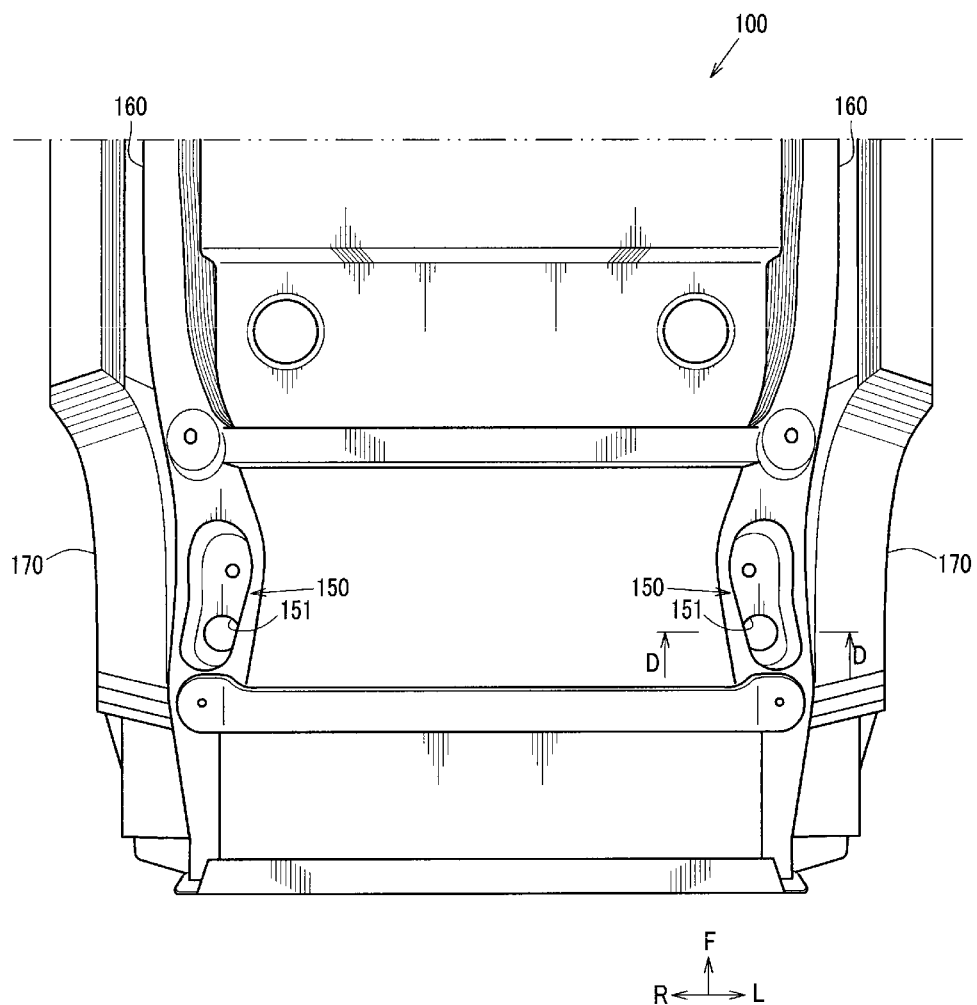
FIG. 11 is a bottom view of a conventional rear vehicle-body structure.
Figure 12:
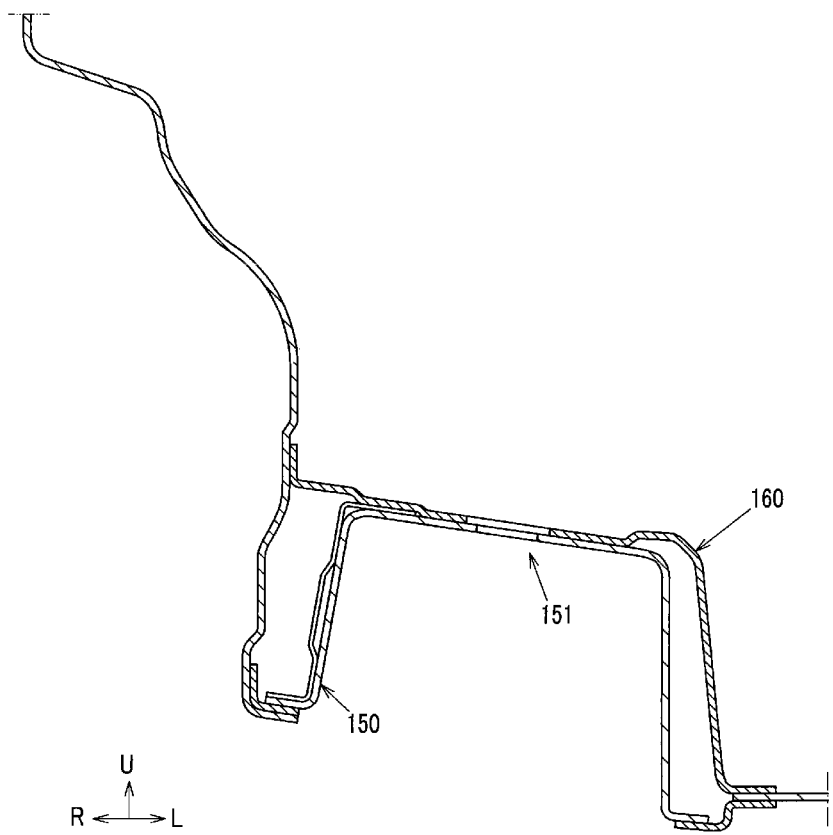
FIG. 12 is an enlarged sectional view taken along line D-D of FIG. 11.

Further, as shown in FIGS. 1 and 2, a rear cross member upper 11 (see FIG. 11) and a rear cross member lower 12 (see FIG. 2) are fixedly joined to upper-and-lower both portions of the rear floor panel 4 at a border portion of the rear floor front portion 4F and the rear-floor rear portion 4R. These 11, 12 are rear cross members (a so-called No. 4 cross member) which extend in the vehicle width direction and interconnect the both-side frame members 6, respectively. Closed cross sections 11*s*, 12*s* which overlap in the vertical direction are formed between the rear cross member upper 11 and the rear floor panel 4 and also between the rear cross member lower 12 and the rear floor panel 4.

Moreover, as shown in FIG. 2, a rear-side rear cross member 13 (a so-called No. 5 cross member) which extends in the vehicle width direction across the concave portion 4*a* of the rear-floor rear portion 4R and interconnects the both-side frame members 6 is fixedly joined to the rear-floor rear portion 4R from a lower-face side of the rear-floor rear portion 4R. A closed cross section 13*s* which extends in the vehicle width direction is formed between the rear-side rear cross member 13 and the rear floor panel 4.

Subsequently, details of the rear vehicle-body structure V of the present embodiment will be described. Herein, since the rear vehicle-body structure V is laterally symmetrical, the rear vehicle-body structure V will be described based on a left-side structure of the vehicle body referring to FIGS. 3-7, in addition to FIGS. 1 and 2.

As shown in FIG. 2, the frame member 6 of the present embodiment is provided with suspension-component attachment portions 14 (15), 16 at a middle position, in the vehicle longitudinal direction, of the frame member 6 (a position corresponding to a rear suspension, not illustrated).

Figure 3:
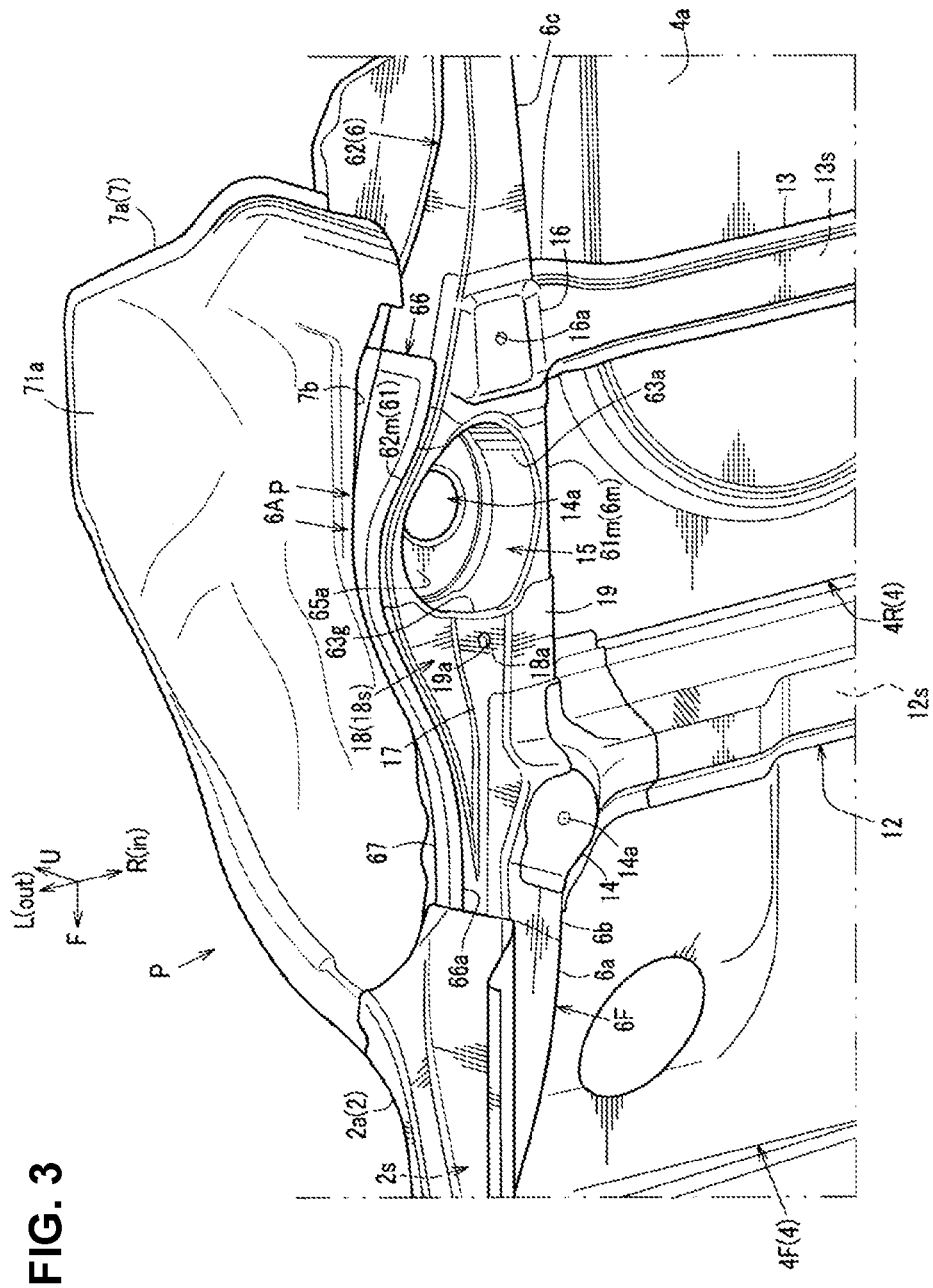
FIG. 3 is a perspective view of a major part of the rear vehicle-body structure of the present embodiment, when viewed from an outward side in a vehicle width direction and a bottom-face side.

As shown in FIGS. 2 and 3, the suspension-component attachment portions 14 (15), 16 comprise a front-side suspension-component attachment portion 14, a damper support portion (15), and a rear-side suspension-component attachment portion 16 which are provided along the vehicle longitudinal direction at the middle position, in the vehicle longitudinal direction, of the frame member 6.

The front-side suspension-component attachment portion 14 is configured to protrude downwardly in a pedestal shape, having a bolt insertion hole 14*a*, at a position located in front of the middle position, in the vehicle longitudinal direction, of the frame member 6. Herein, a rear-suspension component, such as a suspension cross member, not illustrated, or a trailing arm, is attachable to the attachment portion 14 by means of a bolt for suspension attaching (not illustrated) to be inserted in the bolt insertion hole 14*a*.

The rear-side suspension-component attachment portion 16 is configured to protrude downwardly in a pedestal shape, having a bolt insertion hole 16*a*, at a position located in back of the front-side suspension-component attachment portion 14. Herein, a rear-suspension component, such as a suspension cross member, is attachable to the attachment portion 16 by means of a bolt for suspension attaching (not illustrated) to be inserted in the bolt insertion hole 16*a*.

The above-described rear cross members 11, 12 are joined to the both-side frame members 6 from the inward side in the vehicle width direction at a position corresponding to the front-side suspension-component portion 14 in the vehicle longitudinal direction (see FIGS. 2 and 3). The above-described rear-side rear cross member 13 is joined to the both-side frame members 6 from the inward side in the vehicle width direction at a position corresponding to the rear-side suspension-component portion 16 in the vehicle longitudinal direction (see the same figures).

Figure 5:
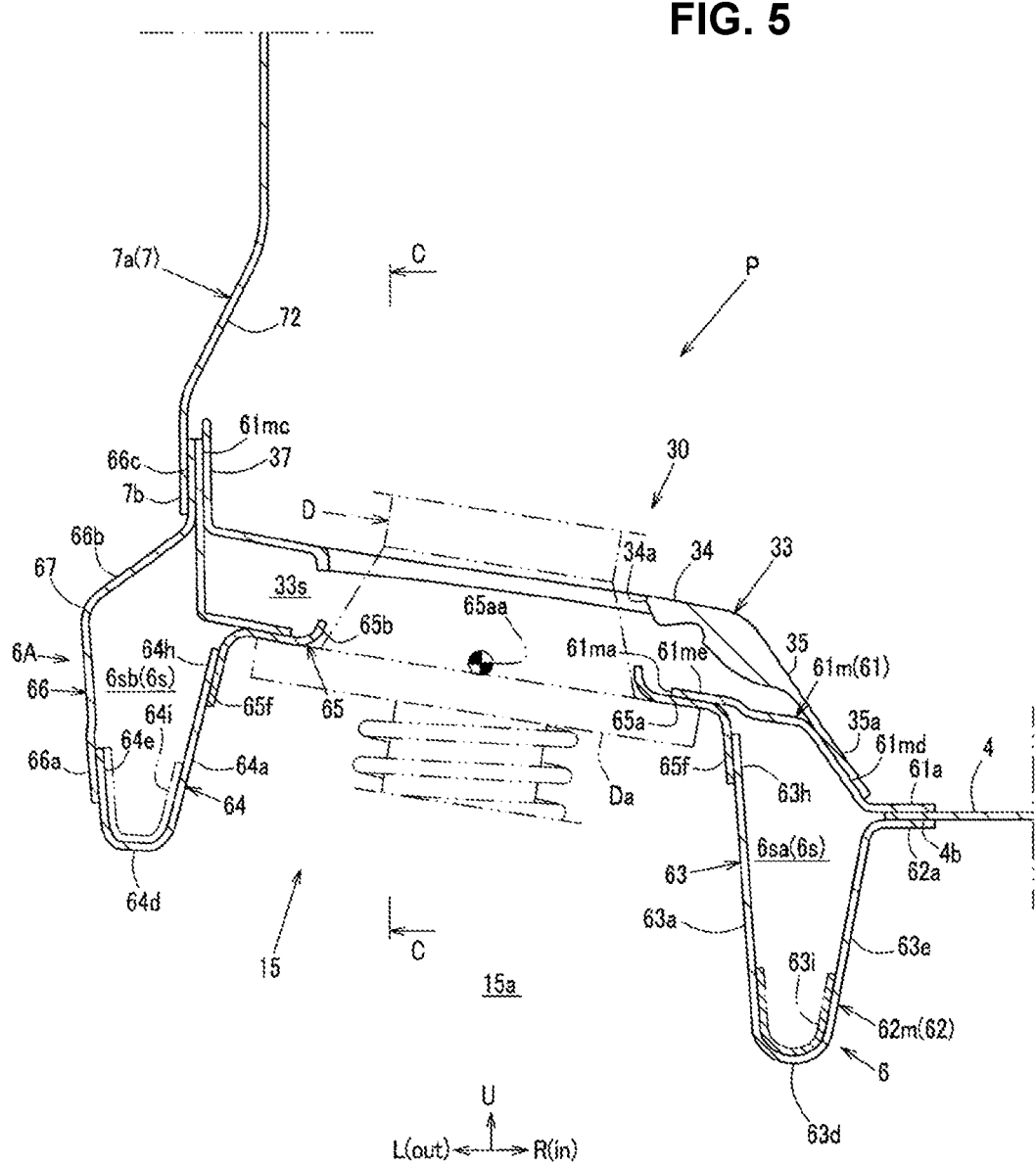
FIG. 5 is an enlarged sectional view taken along line A-A of FIG. 2.

Meanwhile, as shown in FIGS. 3 and 5, a recessed portion 15 which is configured such that a central part, in the vehicle width direction, of a lower face of the frame member 6 is recessed upwardly is formed at a position located between the front-and-rear suspension-component attachment portions 14, 15, in other words, at a middle position, in the vehicle longitudinal direction, of the wheel house inner 7*a* (a position corresponding to the top portion 71*a* (see FIG. 3)) of the frame member 6. Herein, FIG. 5 shows a sectional view taken along line A-A of FIG. 2, specifically a cross section of the frame member 6 at a recessed-portion corresponding position P in the vehicle longitudinal direction.

The recessed portion 15 has an opening portion 15*a* which is opened in the vertical direction at the central part, in the vehicle width direction, of the lower face of the frame member 6 (see FIG. 5), and this is configured as the above-described damper support portion (15) where a damper D (see FIG. 5) of the rear suspension, not illustrated, is fixed, being inserted through the opening portion 15*a*.

That is, as shown in FIG. 2, the damper support portion (15) of the present embodiment is formed by providing the recessed portion 15 at the frame member 6, and a wide portion 6A of the frame member 6 which is configured to be outwardly wider in the vehicle width direction than any other portion of the frame member 6 is formed at the position P, in the vehicle longitudinal direction, of the frame member 6 which corresponds to the recessed portion 15 (i.e., the recessed-portion corresponding position P) (see FIGS. 2 and 3).

Accordingly, as shown in FIG. 5, at the recessed-portion corresponding position P of the frame member 6 are provided a closed cross section 6sa which is positioned on the inward side in the vehicle width direction (the inward-side closed cross section 6sa) and another closed cross section 6sb which is positioned on the outward side in the vehicle width direction (the outward-side closed cross section 6sb) which branch off from the longitudinally-extending closed cross section 6s of the frame member 6 inwardly and outwardly, respectively, in the vehicle width direction relative to the damper D which inserted into and fixed to the recessed portion 15.

Thereby, as shown in FIG. 2, a load path of a rear-collision load which is transmitted forwardly passing through the recessed-portion corresponding position P of the frame member 6 in a vehicle rear collision is constituted by two load paths L1, L2 which respectively correspond to the inward-side closed cross section 6sa and the outward-side closed cross section 6sb at the recessed-portion corresponding position P.

Further, in the rear vehicle-body structure V of the present embodiment, the recessed portion 15 is provided at the frame member 6 so that the frame member 6 can have a damper-support function.

Accordingly, the both-side frame members 6 are provided to be offset inwardly in the vehicle width direction as a whole (i.e., their parallelly-extending portions of the both-side frame members are provided to be offset inwardly in the vehicle width direction), compared to the conventional structure where the frame member, the damper support portion, and the wheel house inner are separately arranged from the inward side toward the outward side in the vehicle width direction.

That is, since the frame member 6 of the present embodiment is configured such that its axial center 6x (see FIG. 2) extending along its longitudinal direction (the vehicle longitudinal direction) is offset inwardly in the vehicle width direction, compared to the conventional structure described above, its inwardly-offset amount from the side sill 2 becomes greater than that of the conventional structure.

As shown in FIGS. 2 and 3, the frame member 6 of the present embodiment is configured such that another part than its front part extends substantially in parallel to the vehicle longitudinal direction. Also, its front part has an oblique portion 6F which is configured to extend obliquely forwardly and outwardly, and a front end of the oblique portion 6F (i.e., a front end of the frame member 6) is joined to a rear portion of the side sill 2 (see the same figures).

Since the frame member 6 is configured such that the front part has the oblique portion 6F and the front end is connected to the side sill 2 as described above, the front end of the frame member 6 can be smoothly connected to the rear portion of the side sill 2 even in the structure of the present embodiment in which the frame member 6 is inwardly offset from the side sill 2 in the vehicle width direction. Accordingly, the rear-collision load can be efficiently transmitted from the frame member 6 to the side sill 2 in the vehicle rear collision.

Herein, the oblique portion 6F of the present embodiment corresponds to a section of the frame member 6 which is located from a position located between the recessed-portion corresponding position P and the front-side suspension-component attachment portion 14 (in other words, a position corresponding to a front end of the wide portion 6A) to the front end of the frame member 6.

Further, as shown in FIGS. 2 and 3, a front portion of the oblique portion 6F overlaps a rear portion of the side sill inner 2a, that is, overlaps, in the vehicle longitudinal direction, an area from a rear end of the side sill inner 2a to a position behind the kick-up portion 3. The front portion of the oblique portion 6F is joined to the rear portion of the side sill inner 2a from the inward side in the vehicle width direction at this overlapping area.

Further, the frame member 6 of the present embodiment is provided with the wide portion 6A at the recessed-portion corresponding position P according to providing the recessed portion 15 as the damper support portion (15) as descried above. In particular, this wide portion 6A is configured such that a part of the frame member 6 is wide outwardly in the vehicle width direction (see the same figures).

The axial center 6x (see FIG. 2) of the frame member 6 can be made offset outwardly in the vehicle width direction (toward the side sill 2 in the vehicle width direction) at the recessed-portion corresponding position P (the wide portion 6A), compared to a case where the wide portion 6A is not formed, so that any harmful influence which may be caused by providing the recessed portion 15 at the frame member 6 can be corrected.

Specifically, the inwardly-offset amount of the frame member 6 relative to the side sill 2 becomes large by providing the recessed portion 15 at the frame member 6, so that smooth transmission of the rear-collision load from the frame member 6 to the side sill 2 in the vehicle rear collision is so hindered that there is a concern that there may occur deformation in that the overlapping amount, in the vehicle longitudinal direction, of the front portion of the frame member 6 and the rear portion of the side sill 2 becomes large, that is, the frame member and the side sill member produce together a Z shape in a plan view. However, this harmful influence can be suppressed by the above-described structure of the present embodiment.

The above-described wide portion 6A is configured such that an outward edge portion 6o, in the vehicle width direction, of the frame member 6 is positioned gently outwardly in the vehicle width direction over an area from a place located behind the rear-side suspension-component attachment portion 16 to another place located right behind the front-side suspension-component attachment portion 14 so that the recessed-portion corresponding position P is located at the most outward position (see FIG. 2).

Meanwhile, an inward edge side 6i, in the vehicle width direction, of the frame member 6 is positioned substantially linearly along the vehicle longitudinal direction over an area from a rear end of the frame member 6 to its joint portion to rear cross member lower 12, without being positioned inwardly in the vehicle width direction at the wide portion 6A including the recessed-portion corresponding position P (see FIG. 2).

That is, the wide portion 6A is configured such that only the outward edge portion 6o of the frame member 6 protrudes toward the wheel house inner 7a at the recessed-portion corresponding position P. Herein, the recessed portion 15 is of an ellipse (oval) shape having a major axis which matches the vehicle longitudinal direction in a bottom view, and a center of FIG. 65aa (see FIG. 5) of the recessed portion 15 is positioned at a central portion, in the vehicle width direction, of the wide portion 6A (the recessed-portion corresponding position P) of the frame member 6.

Thereby, as shown in FIG. 2, in the load paths L1, L2 of the rear-collision load which pass through the recessed-portion corresponding position P of the frame member 6 in the vehicle rear collision, the load path L2 passing through the outward-side closed cross section 6sb proceeds forwardly, going outwardly around the recessed portion 15 at the recessed-portion corresponding position P of the frame member 6, whereas the load path L1 passing through the inward-side closed cross section 6sa proceeds linearly forwardly along the longitudinal direction of the frame member 6 (the vehicle longitudinal direction) without going inwardly around the recessed portion 15.

Figure 6:
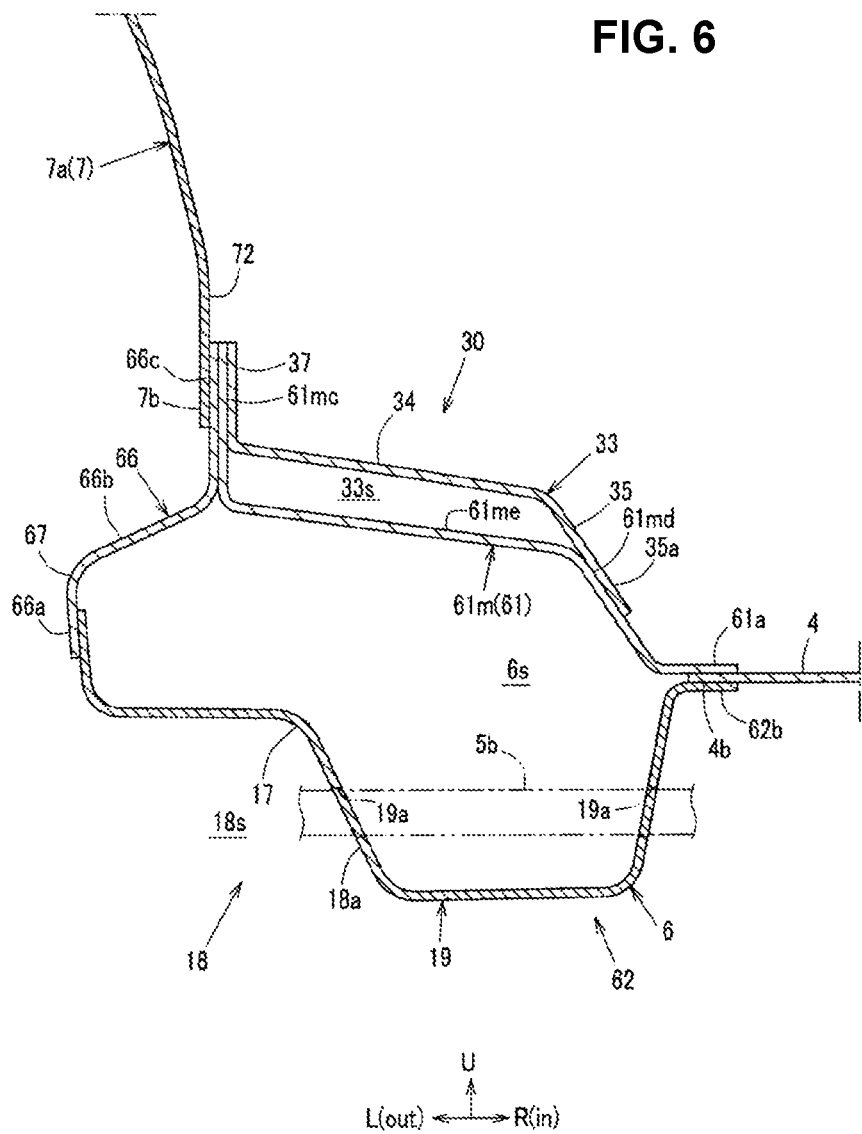
FIG. 6 is an enlarged sectional view taken along line B-B of FIG. 2.

Further, as shown in FIGS. 2, 3 and 6, a ridgeline 17 which extends continuously in the longitudinal direction of the frame member 6 (the vehicle longitudinal direction) is formed at a portion of a lower face portion of the frame member 6 which is positioned in front of the recessed-portion corresponding position P.

As shown in FIGS. 2 and 3, the ridgeline 17 extends forwardly from a front lower end of the recessed portion 15 (a font end of the opening portion 15a of the recessed portion 15) up to a position located beyond the rear cross member lower 12 in the vehicle longitudinal direction of the frame member 6.

More specifically, the ridgeline 17 extends forwardly from the front lower end of the recessed portion 15 beyond a position which corresponds to an axial center 12x extending in the vehicle width direction of the rear cross member lower 12 (see FIG. 2).

Further, as shown in FIG. 2, a front portion of the ridgeline 17 (a portion positioned in front of a front-end corresponding position of the wide portion 6A) extends along an outward edge, in the vehicle width direction, of the front-side suspension-component attachment portion 14 such that its front side is positioned on the outward side in the vehicle width direction along the oblique shape of the front portion (the oblique portion 6F) of the frame member 6, and its front end joins the outward edge portion 6o of the frame member at a position right before the side will inner 2a.

As shown in FIGS. 2, 3 and 6, a recess portion 18 which is recessed inwardly and upwardly is formed at a corner portion of an outward-side lower portion of a portion of the frame member 6 which is positioned in front of the recessed-portion corresponding position P by providing the ridgeline 17 at the lower face of the frame member 6. This recess portion 18 can form a recess-shaped space 18s which is opened downwardly and outwardly at a position located on the outward side in the vehicle width direction and below the ridgeline 17 of the frame member 6.

In other words, as shown in FIG. 3, by providing the ridgeline 17 at the lower face of the frame member 6, the cross section of the lower portion of the frame member 6 is configured in a step shape relative to the ridgeline 17 such that its inward-side portion protrudes downwardly relative to its outward-side portion (the recess portion 18), and a step face 18a which extends in the vertical direction is formed along the ridgeline 17 at a position corresponding to the ridgeline 17 in the vehicle width direction.

Herein, as shown in FIGS. 3 and 6, at a downward protrusion portion 19 which is a portion of the lower face of the frame member 6 which is positioned on the inward side, in the vehicle width direction, of the ridgeline 17 is provided a pipe insertion portion 19a where the breather pipe 5b which is provided to extend in the vehicle width direction across the downward protrusion portion 19 is inserted.

Accordingly, while the fuel pipe 5a and the breather pipe 5b which extend from the fuel tank 5 are provided to extend from the inward side to the outward side in the vehicle width direction across the frame member 6, the fuel pipe 5a extends below and across the oblique portion 6F of the frame member 6 (see FIG. 2), whereas the breather pipe 5b extends across the downward protrusion portion 19 of the frame member 6 in a state of its being inserted into the pipe insertion portion 19a (see FIGS. 2 and 6).

Herein, while the present embodiment is configured such that only the breather pipe 5b is provided to extend across the downward protrusion portion 19 in the state of its being inserted into the pipe insertion portion 19a, the present invention is not limited to this structure, but a structure in which a pipe insertion portion where the fuel pipe 5a or any other pipe are inserted is provided at the downward protrusion portion 19 of the frame member, which is not illustrated, is applicable as well.

While the breather pipe 5b is configured, as described above, to be inserted into the pipe insertion portion 19a provided at the downward protrusion portion 19 of the frame member 6 from the inward side in the vehicle width direction and extend outwardly in the vehicle width direction, an extension portion of the breather pipe 5b may be arranged in the recess-shaped space 18s which is positioned at the outward-lower portion of the frame member 6.

That is, by arranging the extension portion of the breather pipe 5b of the breather pipe 5b which extends outwardly in the vehicle width direction relative to the frame member 6 (the downward protrusion portion 19) at the recess-shaped space 18s formed by the recess portion 18, the layout performance (arranging performance) of the extension portion can be improved.

Accordingly, the layout performance (arranging performance) of the extension portion can be improved, holding the breather pipe 5b at the frame member 6 (the downward protrusion portion 19) by being inserted into the pipe insertion portion 19a and also preventing the above-described extension portion of the breather pipe 5b from interfering with the wheel house inner 7a which is provided on the outward side of and closely to the frame member 6 by the recess-shaped space 18s.

As shown in FIG. 2, the frame member 6 is constituted by integrally connecting plural members 6a, 6b, 6m in the vehicle longitudinal direction, and in particular, the frame member upper 61 is constituted by a middle member 61m and the frame member lower 62 is constituted by a middle member 62m.

Figure 7:
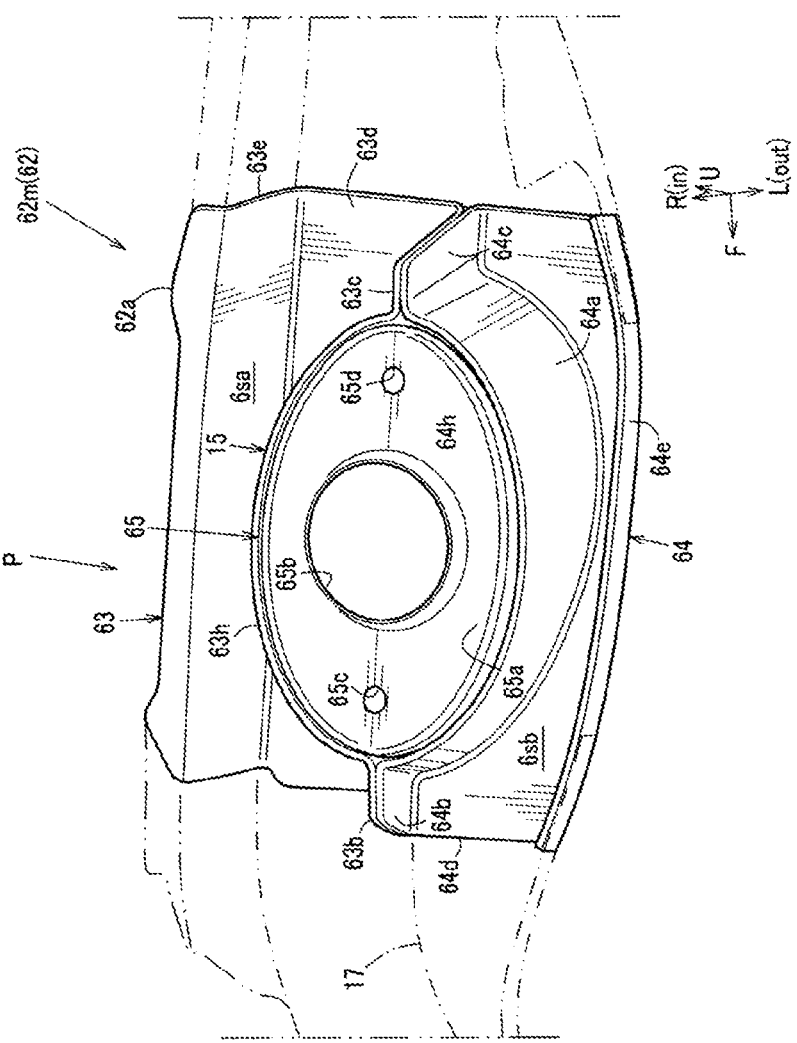
FIG. 7 is an explanatory view of an inside structure of a portion of a front side frame which corresponds to a recessed portion in a state where an upper face is removed, when viewed from an upward side and an inward side in the vehicle width direction.
Figure 8:
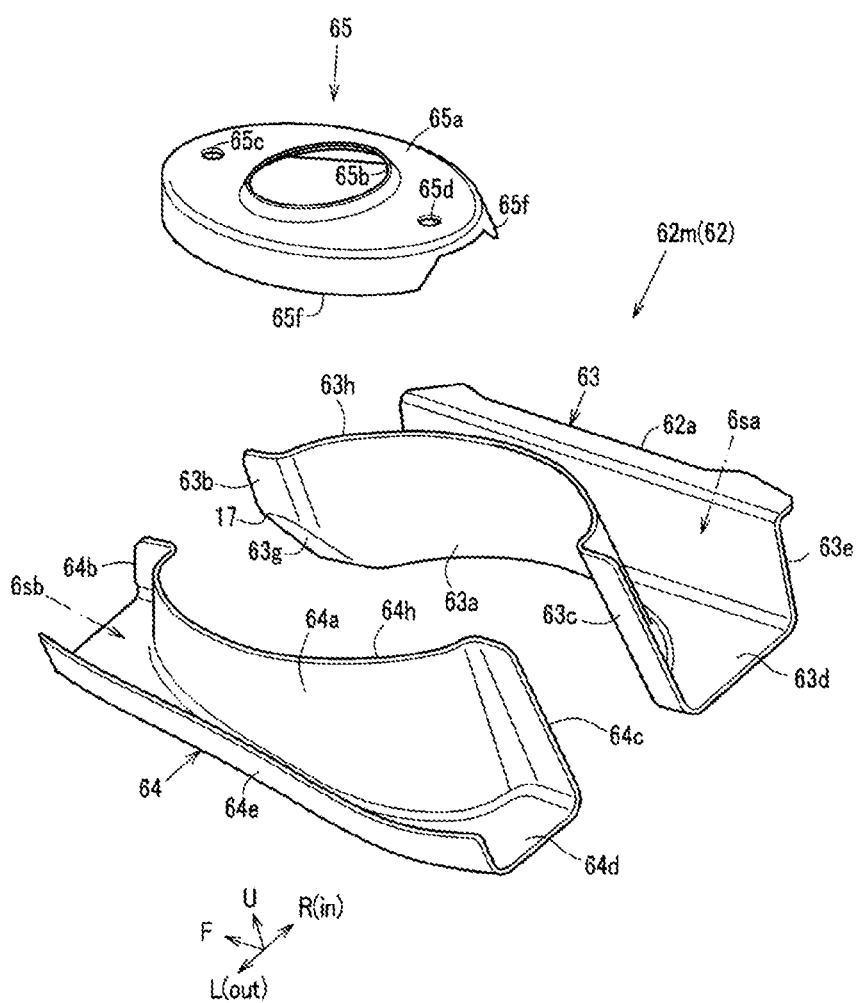
FIG. 8 is an exploded perspective view of the portion of the front side frame corresponding to the recessed portion shown in FIG. 7.

FIG. 7 is a perspective view of the recessed-portion corresponding position P, in the vehicle longitudinal direction, of the frame member 6 in a state where the middle member 61m of the frame member upper 61 is removed, when viewed from an outward-and-upward side. FIG. 8 is an exploded view of the recessed portion 15 of the frame member 6.

As shown in FIGS. 5-8, the frame member 6 is constituted, at the recessed-portion corresponding position P, in the vehicle longitudinal direction, thereof, by the frame-upper middle member 61m (see FIGS. 5 and 9) which corresponds to the middle member 61m of the frame member upper 61, the frame lower middle member 62m which corresponds to the middle member 62m of the frame member lower 62, a top-plate member 65 which attaches the damper D at a concave bottom of the recessed portion 15, and an outer panel 66 (see FIGS. 3 and 5) which constitutes an outward side face.

Further, as shown in FIGS. 5, 7 and 8, the frame lower middle member 62m is constituted by a frame-lower inward-side middle member 63 and a frame-lower outward-side middle member 64.

The frame-lower inward-side middle member 63 comprises a recess inward-side face portion 63a which protrudes inwardly in the vehicle width direction so as to constitute a side face of an inward-side half, in the vehicle width direction, of the ellipse-shaped recessed portion 15, a front-side flange portion 63*b* (see FIGS. 7 and 8) which extends forwardly from a front edge of the recess inward-side face portion 63*a*, a rear-side flange portion 63*c* (see the same figures) which extends rearwardly from a rear edge of the recess inward-side face portion 63*a*, a lower face portion 63*d* which extends inwardly and longitudinally relative to a lower end portion of the recess inward-side face portion 63*a* so as to constitute a lower face (bottom face) of the inward-side closed cross section 6*sa*, an inward-side face portion 63*e* which rises in a vertical-wall shape from an inward end, in the vehicle width direction, of the lower face portion 63*d*, and a joint flange portion 62*a* which extends inwardly from an upper end of the inward-side face portion 63*e*, which are all formed integrally.

Herein, as shown in FIG. 5, the joint flange portion 62*a* is joined to the outward-side end portion 4*b* of the rear floor panel 4 from the lower-face side as described.

Further, as shown in FIG. 8, the frame-lower inward-side middle member 63 is configured such that an outward-side end of the lower face portion 63*d* is joined not only to an entire part of the half eclipse-shaped lower end portion of the recess inward-side face portion 63*a* but to respective lower end portions of the front-side flange portion 63*b* and the rear-side flange portion 63*c* (specifically, a rear-end corresponding portion 63*g* which will be described (see FIG. 8)).

Moreover, as shown in FIGS. 3 and 8, a rear-end corresponding portion 63*g* of the step face 18*a* (see FIGS. 3 and 6) of the frame member 6 which is positioned in front of the recessed portion 15 is provided at a lower portion of a vertically-extending front edge of the recess inward-side face portion 63*a*. That is, as shown in FIG. 8, the rear-end corresponding portion 63*g* is provided at a lower portion of the front-side flange portion 63*d*, and the front-side flange portion 63*b* is integrally formed, in the vertical direction, at a front portion of the recess inward-side face portion 63*a* including the rear-end corresponding portion 63*g*. Meanwhile, the rear-side flange portion 63*c* is also formed at a whole part, in the vertical direction, of a rear edge of the recess inward-side face portion 63*a*.

As shown in FIGS. 5, 7 and 8, the frame-lower outward-side middle member 64 comprises a recess outward-side face portion 64*a* which protrudes outwardly in the vehicle width direction so as to constitute a side face of an outward-side half, in the vehicle width direction, of the ellipse-shaped recessed portion 15, a front-side flange portion 64*b* (see FIGS. 7 and 8) which extends forwardly from a front edge of the recess outward-side face portion 64*a*, a rear-side flange portion 64*c* (see the same figures) which extends rearwardly from a rear edge of the recess outward-side face portion 64*a*, a lower face portion 64*d* which extends outwardly and longitudinally relative to a lower end portion of the recess inward-side face portion 64*a* so as to constitute a lower face (bottom face) of the outward-side closed cross section 6*sb*, and a joint flange portion 64*e* which rises in a vertical-wall shape from an outward end, in the vehicle width direction, of the lower face portion 64*d*, which are all formed integrally.

Herein, as shown in FIGS. 7 and 8, the frame-lower outward-side middle member 64 is configured such that a vertical length of the recess outward-side face portion 64*a* becomes gradually smaller from the rearward side to the forward side of the vehicle by providing the recess portion 18 at an outward side, in the vehicle width direction, of a front side of the recessed portion 15.

Similarly to the frame-lower inward-side middle member 63, an inward-side end of the lower face portion 64*d* of the frame-lower outward-side middle member 64 is joined not only to an entire part of the half eclipse-shaped lower end portion of the recess outward-side face portion 64*a* but to respective lower end portions of the front-side flange portion 64*b* and the rear-side flange portion 64*c*.

The joint flange portion 64*e* of the frame-lower outward-side middle member 64 is joined to a lower end portion of the outer panel 66 as shown in FIG. 5.

As shown in FIGS. 5, 7 and 8, the top-plate member 65 comprises a flat-plate shaped damper attachment portion 65*a* which is of the ellipse (oval) shape in the plan view and a joint flange portion 65*f* which extends downwardly from a peripheral edge of the damper attachment portion 65*a* except longitudinal both ends thereof, which are integrally formed.

A damper insertion hole 65*b* where the damper D is inserted is formed at a central portion, in the plan view, of the damper attachment portion 65*a*, and bolt insertion holes 65*c*, 65*d* are formed at positions of the damper attachment portion 65*a* which are located in front of and in back of the damper insertion hole 65*b* (see FIGS. 7 and 8). The damper D is attached and fixed to the damper attachment portion 65*a* by inserting the damper D into the damper insertion hole 65*b* from below, inserting bolts into the bolt insertion holes 65*c*, 65*d* in a state where a flange-shaped attachment portion Da (see FIG. 5) which is provided at the damper side contacts a lower face of the damper attachment portion 65*a*, and finally fastening the bolts.

The above-described recessed portion 15 is constituted by connecting the respective front-side flange portions 63*b*, 64*b* of the frame-lower inward-side middle member 63 and the frame-lower outward-side middle member 64 and also connecting the respective rear-side flange portions 63*c*, 64*c* of the frame-lower inward-side middle member 63 and the frame-lower outward-side middle member 64 (see FIG. 7). Further, as shown in FIG. 5, the recessed portion 15 is constituted by joining the joint flange portion 65*f* of the top-plate member 65 to respective upper portions 63*h*, 64*h* of the frame-lower inward-side middle member 63 and the frame-lower outward-side middle member 64 from the inner-face side of the recessed portion 15.

Herein, as shown in FIGS. 5 and 6, the frame-upper middle member 61*m* is arranged so as to cover over the frame lower middle member 62*m* and the top-plate member 65 which are joined integrally as described above, and as shown in FIG. 5, in particular, the frame-upper middle member 61*m* is joined to the upper face of the damper attachment portion 65*a* at a part of the frame-upper middle member 61*m* which corresponds to the damper attachment portion 65*a* in the plan view.

Figure 9:
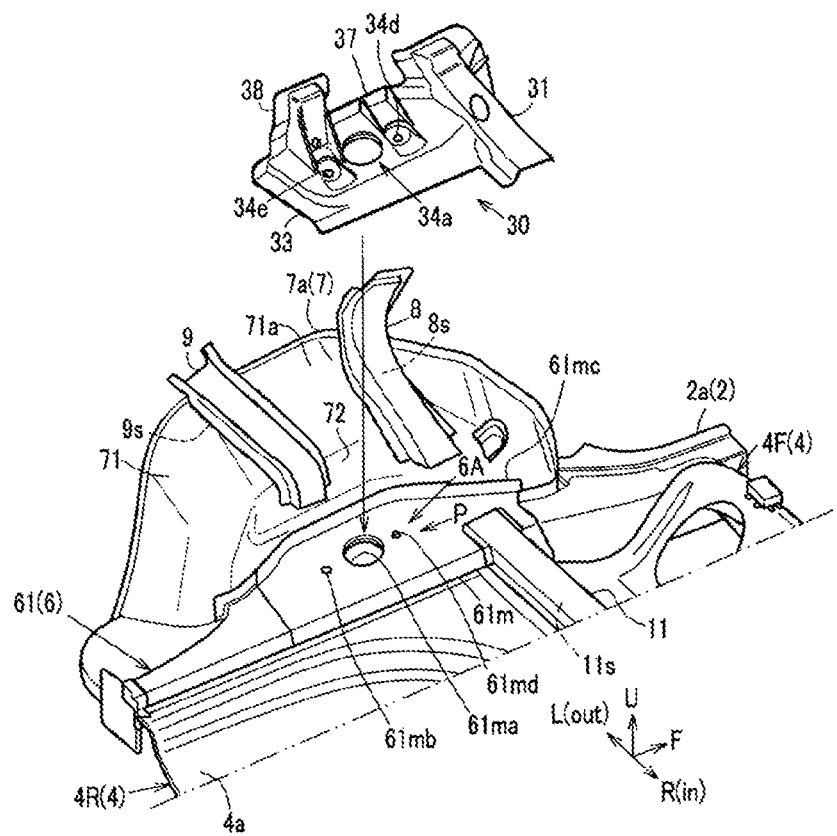
FIG. 9 is a perspective view of a major part of the rear vehicle-body structure shown in FIG. 1, which shows a state where a reinforcing member is separated from an upper face of the front side frame.

Moreover, at respective parts of the frame-upper middle member 61*m* which correspond to the damper insertion hole 65*d* and the front-side and rear-side bolt insertion holes 65*c*, 65*d* of the damper attachment portion 65*a* are formed a damper insertion hole 61*ma* (see FIGS. 5 and 9) which connects to the damper insertion hole 65*b* and front-side and rear-side bolt insertion holes 61*mb*, 61*md* which connect to the front-side and rear-side bolt insertion holes 65*c*, 65*d* (see FIG. 9).

As shown in FIG. 5, a lower end portion 66*a* of the outer panel 66 is joined to the joint flange portion 64*e* of the frame-lower outward-side middle member 64 as described above. Moreover, the outer panel 66 is provided with an upper-end flange portion 66*c* which rises further upwardly from a body portion 66*b* which constitutes at least an outward-side face of the recessed-portion corresponding position P of the frame member 6 (see FIG. 5).

Meanwhile, as shown in FIGS. 5 and 6, the frame-upper middle member 61*m* is provided with an outward-side flange portion 61*mc* which rises in a vertical-wall shape from an outward end, in the vehicle width direction, of the frame-upper middle member 61*m*.

As shown in the same figure, the upper-end flange portion 66*c* of the outer panel 66, the outward-side flange portion 61*mc* of the frame-upper middle member 61*m*, the lower end portion 7*b* of the wheel house inner 7*a*, and an upper flange portion 37 of a reinforcing member 30, which will be described later, are joined by rivets (not illustrated) or the like in a state where the upper-end flange portion 66*c* and the outward-side flange portion 61*mc* are interposed between the lower end portion 7*b* of the wheel house inner 7*a* and the upper flange portion 37.

Accordingly, as shown in FIG. 5, the inward-side closed cross section 6*sa* is constituted primarily by the frame-lower inward-side middle member 63 and the frame-upper middle member 61*m*, whereas the outward-side closed cross section 6*sb* is constituted primarily by the frame-lower outward-side middle member 64 and the frame-upper middle member 61*m*.

As shown in FIGS. 3, 5 and 6, the outer panel 66 continuously extends forwardly from a portion of the frame member 6 which corresponds to the rear-side suspension-component attachment portion 16 in the vehicle longitudinal direction, passing through the recessed-portion corresponding position P.

As shown in FIG. 3, the outer panel 66 extends along the oblique shape of the oblique portion 6F up to the rear end of the side sill inner 2*a* so as to constitute not only an outward-side face of the recessed-portion corresponding position P of the frame member 6 but an outward-side face of the portion of the frame member 6 which corresponds to the oblique portion 6F.

A front end of the outer panel 66 is joined to a rear end of the side sill inner 2*a*.

Specifically, the lower end portion 7*b* of the wheel house inner 7*a*, the front end of the outer panel 66, and the rear end of the side sill inner 2*a* are three-layer joined by rivets or the like in a state where the front end of the outer panel 66 is interposed between the lower end portion 7*b* of the wheel house inner 7*a* and the rear end of the side sill inner 2*a* (not illustrated).

Further, as shown in FIGS. 3 and 6, a ridgeline 67 which protrudes outwardly in the vehicle width direction is formed at the outer panel 66. This ridgeline 67 continuously extends in a longitudinal direction of the outer panel 66 (in the vehicle longitudinal direction) over an area from the recessed-portion corresponding position P to it joint portion to the side sill 2, thereby increasing the strength of the outer panel 66 extending along the oblique shape of the oblique portion 6F.

In the present embodiment, as shown in FIGS. 1, 4-6, 9 and 10, the reinforcing member 30 to reinforce the recessed-portion corresponding position P of the frame member 6, in particular, is provided at an upper portion of the frame member 6.

The reinforcing member 30 comprises a connecting member portion 31 (see FIGS. 1, 4 and 9) which connects the front-side side brace 8 and the rear cross member upper 11 at a position, in the vehicle longitudinal direction, of the frame member 6 which is located in front of the recessed-portion corresponding position P and a reinforcing-member body portion 33 which is positioned in back of the connecting member portion 31, which are formed integrally by aluminum die-casting.

Figure 4:
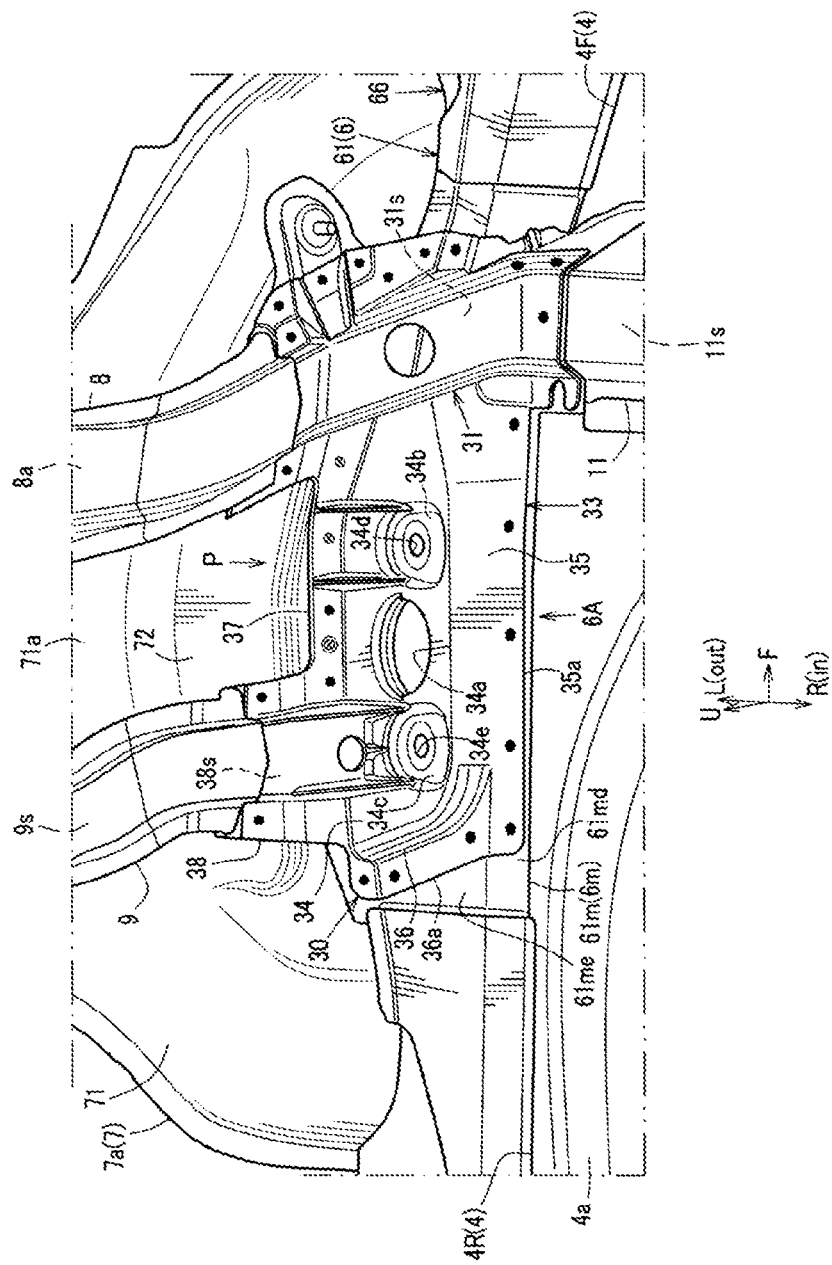
FIG. 4 is an enlarged view of the major part of the rear vehicle-body structure of the present embodiment, when viewed from an arrow A of FIG. 1.

As shown in FIGS. 1, 4 and 9, the connecting member portion 31 extends in the vehicle width direction above and across the frame member 6, and an outward end, in the vehicle width direction, thereof is connected to a lower end of the front-side side brace 8 and an inward end, in the vehicle width direction, thereof is connected to an outward end, in the vehicle width direction, of the rear cross member upper 11 from above. Accordingly, the front-side side brace 8 and the rear cross member upper 11 extend continuously via the connecting member portion 31 (see FIGS. 1 and 4).

The connecting member portion 31 is joined to the frame member 6 and the wheel house inner 7*a* such that a closed cross section 31*s* (see FIG. 10) is formed at a corner portion of an inward face, in the vehicle width direction, of the vertical wall portion 72 of the wheel house inner 7*a* and an upper face of the frame member 6.

Figure 10:
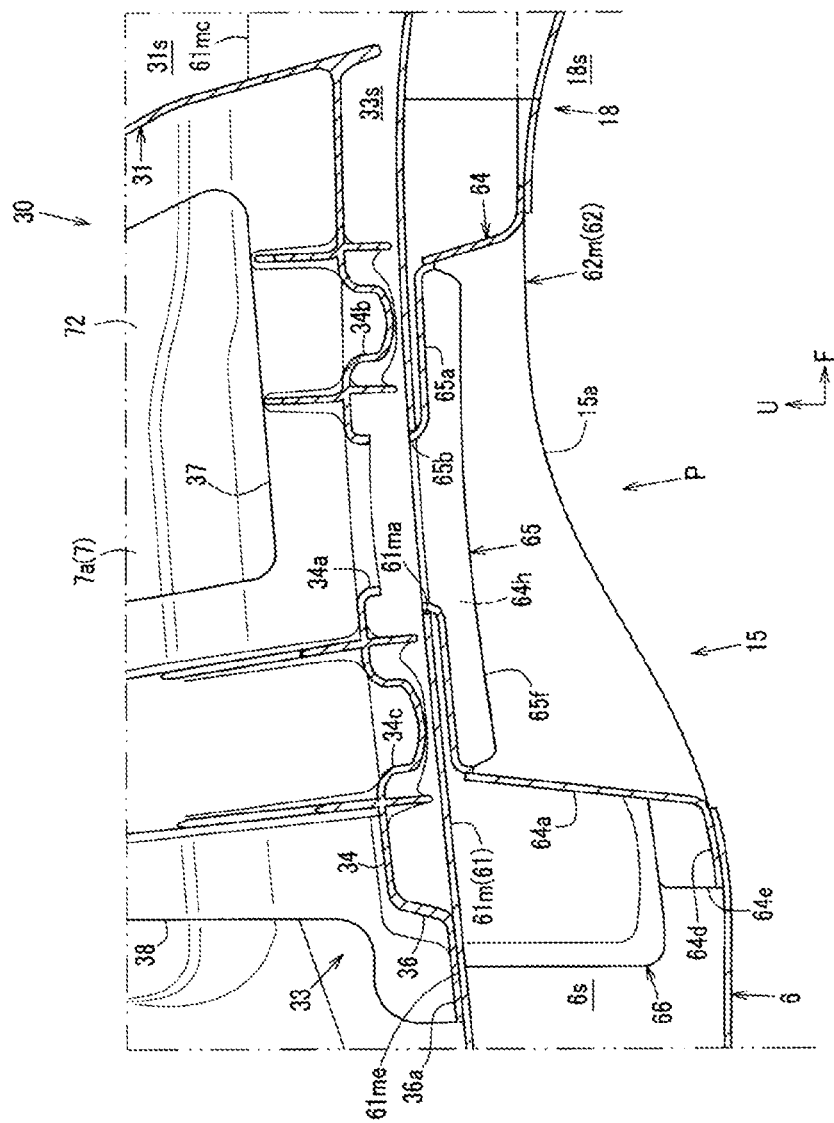
FIG. 10 is a sectional view taken along line C-C of FIG. 5.

As shown in FIGS. 1, 4 and 10, the reinforcing-member body portion 33 is long enough, in the vehicle longitudinal direction, to pass through the recessed corresponding position P of the frame member 6, and as shown in FIGS. 4-6, this body portion 33 is integrally formed by an upper wall portion 34, an inward wall portion 35, and a rear wall portion 36 (see FIG. 4) and others.

As shown in FIGS. 5, 6 and 10, the reinforcing-member body portion 33 is joined to the frame member 6 and the wheel house inner 7*a* such that a closed cross section 33*s* which extends in the vehicle longitudinal direction is formed at least at the corner portion of the frame member 6 and the wheel house inner 7*a*.

As described above, the rear vehicle-body structure V of the present embodiment comprises the frame member 6 provided at the rear portion of the vehicle body and having the closed cross section 6*s* extending in the vehicle longitudinal direction (see FIGS. 1 and 2), the side sill 2 extending in the vehicle longitudinal direction at the position which is offset outwardly in the vehicle width direction from the frame member 6, to which the front portion of the frame member 6 is joined, the recessed portion 15 formed at the frame member 6, wherein the recessed portion 15 is configured such that the lower face of the frame member 6 is recessed upwardly, and the damper D (see FIG. 5) of the rear suspension is inserted into and fixed to the recessed portion 15 (see FIGS. 2 and 3), and the inward-side and outward-side closed cross sections 6*sa*, 6*sb* formed inside the frame member 6 at the longitudinal position P corresponding to the recessed portion 15, wherein the inward-side and outward-side closed cross sections 6*sa*, 6*sb* are configured to branch off from the closed cross section 6*s* of the frame member 6 inwardly and outwardly in the vehicle width direction relative to the damper D (see FIG. 5), wherein the frame member 6 is configured such that the portion of the frame member 6 which is located at the above-described recessed-portion corresponding position P is wide outwardly in the vehicle width direction (toward the side sill 2) (see FIGS. 1-5 and 7).

According to this structure, even if the side sill 2 is arranged at the position which is offset outwardly in the vehicle width direction from the frame member 6 because of providing the recessed portion 15 at the frame member 6, the axial center 6*x* (see FIG. 2) of the frame member 6 can be positioned outwardly in the vehicle width direction, i.e., can be moved toward the side sill 2, by configuring the frame member 6 such that the portion of the frame member 6 which is located at the recessed-portion corresponding position P is wide outwardly in the vehicle width direction.

Thereby, the rear-collision load can be efficiently transmitted forwardly to the side sill 2 from the frame member 6 in the rear collision.

In the embodiment of the present invention, the recced portion 15 is formed at the center, in the vehicle width direction, of the wide portion of the frame member 6 located at the recessed-portion corresponding position P (see FIGS. 2, 3 and 5).

The branch-shaped closed cross sections 6sa, 6sb can be configured to have roughly-equal and properly-wide width on the inward-and-outward sides in the vehicle width direction (see FIG. 5) by providing the recess portion 15 at the center, in the vehicle width direction, of the portion located at the recessed-portion corresponding position P as described above.

In particular, by configuring the portion of the frame member 6 located at the recessed-portion corresponding position P to be wide outwardly in the vehicle width direction, the axial center 6x (see FIG. 2) of the frame member 6 is so moved toward the side sill 2 as described above that the transmission performance of the rear-collision load transmitted from the frame member 6 to the side sill 2 can be increased.

Herein, since the portion of the frame member 6 located at the recessed-portion corresponding position P is not configured to be wide inwardly in the vehicle width direction (see FIG. 2), when the rear-collision load passes through the inward-side closed cross section 6sa at the portion located at the recessed-portion corresponding position P, this load can be forwardly transmitted straightly efficiently, without going around inwardly (see the load path L1 in FIG. 2).

Accordingly, in the frame member 6 provided with the recessed portion 15 as the damper support portion, the damper-support rigidity and the transmission performance of the load transmitted to the side sill 2 from the frame member 6 in the rear collision can be compatibly attained.

In the embodiment of the present invention, the frame member 6 is provided with the outer panel 66 which constitutes the outward face, in the vehicle width direction, of the outward-side closed cross section 6sb (see FIGS. 3 and 5), the outer panel 66 forwardly extends continuously from the recessed-portion corresponding position P so as to constitute the outward face, in the vehicle width direction, of the closed cross section 6s of the frame member 6 which is located in front of the recessed-portion corresponding position P (see FIGS. 3, 5 and 6), and the front end of the outer panel 66 is joined to the side sill 2 (see FIG. 3).

According to this structure, since the frame member 6 is provided with the outer panel 66 which extends continuously from the recessed-portion corresponding position P to its joint portion to the side sill 2 as described above, even in a case where the portion of the frame member 6 which is positioned between its joint portion to the side sill 2 and the recessed-portion corresponding position P is configured to have the narrower width than the recessed-portion corresponding position P as shown in FIG. 2, the rear-collision load can be efficiently transmitted, along the outer panel 66, from the recessed-portion corresponding position P to the joint portion to the side sill 2 in the rear collision, without being concentrated on the above-described narrow portion.

Specifically, since the portion of the frame member 6 located at the recessed-portion corresponding position P is wide outwardly in the vehicle width direction (toward the side sill 2), when the rear-collision load passes through the outward-side closed cross section 6sb at the portion located at the recessed-portion corresponding position P, this load can be forwardly transmitted efficiently along the outer panel 66 even if it constitutes the load path going around outwardly, not going around inwardly (see the load path L2 in FIG. 2).

In the embodiment of the present invention, the ridgeline 67 which extends continuously over a range from the recessed-portion corresponding position P to the joint portion of the outer panel 6 to the side sill 2 is formed at the outer panel 66 (see FIGS. 3 and 6).

According to this structure, by forming the ridgeline 67 at the outer panel 66, even if the portion of the frame member 6 between the recessed-portion corresponding position P and the joint portion to the side sill 2 is narrower than the recessed-portion corresponding position P, the strength of the narrow portion can be secured properly, so that the rear-collision load can be efficiently transmitted forwardly to the side sill 2 along the ridgeline 67 formed at the outer panel 66 of the frame member 6 in the rear collision.

In the embodiment of the present invention, the front-side suspension-component attachment portion 14 where the suspension component (not illustrated) of the rear suspension is attached is provided between the joint portion of the frame member 6 to the side sill 2 and the recessed-portion corresponding position P (see FIGS. 2 and 3).

Herein, the front-side suspension-component attachment portion 14 is generally configured to have the higher rigidity than any other part of the frame member 6 for proper attachment of the suspension component (such as the trailing arm or the suspension cross member, not illustrated). Therefore, according to this structure, by providing the suspension-component attachment portion 14 between the joint portion of the frame member 6 to the side sill 2 and the recessed-portion corresponding position P, the strength of the above-described narrower portion can be secured properly.

Accordingly, even if the portion of the frame member 6 between the joint portion to the side sill 2 and the recessed-portion corresponding position P is relatively narrow, the rear-collision load can be efficiently transmitted forwardly to the side sill 2, without being concentrated on this narrow portion.

The present invention is not limited to the above-described embodiment only, but applicable in various manners. For example, as further another embodiment, as shown by an imaginary line in FIG. 5, an inward-side reinforcing panel 63i to reinforce the frame-lower inward-side middle member 63 may be provided in the inward-side closed cross section 6sa. Likewise, an outward-side reinforcing panel 64i to reinforce the frame-lower outward-side middle member 64 may be provided in the outward-side closed cross section 6sb.

Herein, according to the embodiments descried above, the recessed portion 15 is formed by different members of the floor-lower middle member 62m (63, 64) which corresponds to the side face portion thereof and the top-plate member 65 which correspond to the damper support portion 15 (see FIGS. 5, 7 and 8), so that these members 62m, 65 can be configured to have different plate-thicknesses which respectively correspond to the required damper-support strength. Specifically, in the embodiments described above, since the damper support portion 15 can be configured to have the thinner plate thickness than the side face portion by providing the reinforcing members 30, 30A at the upper portion of the frame member 6, the weight of the recessed portion 15 can be properly light as a whole even if the inward-side reinforcing panel 63i and the outward-side reinforcing panel 64i are provided as described above.

What is claimed is:

1. A rear vehicle-body structure, comprising:
   a frame member provided at a rear portion of a vehicle body and having a closed cross section extending in a vehicle longitudinal direction;
   a side sill extending in the vehicle longitudinal direction at a position which is offset outwardly in a vehicle width direction from the frame member, to which a front portion of the frame member is joined;
   a wheel house provided on an outward side of the frame member in the vehicle width direction;
   a recessed portion formed at the frame member, wherein the recessed portion is configured such that a lower face of the frame member is recessed upwardly, and a damper of a rear suspension is inserted into and fixed to the recessed portion; and
   inward-side and outward-side closed cross sections formed inside the frame member at a longitudinal position corresponding to the recessed portion, wherein the inward-side and outward-side closed cross sections are configured to branch off from the closed cross section of the frame member inwardly and outwardly in the vehicle width direction relative to the damper,
   wherein said frame member is configured such that a portion of the frame member which is located at said longitudinal position corresponding to the recessed portion is wide outwardly in the vehicle width direction.

2. The rear vehicle-body structure of claim 1, wherein said recessed portion is formed at a center, in the vehicle width direction, of said wide portion of the frame member located at the position corresponding to the recessed portion.

3. The rear vehicle-body structure of claim 1, wherein said frame member is provided with an outer panel which constitutes an outward face, in the vehicle width direction, of said outward-side closed cross section, said outer panel forwardly extends continuously from said position corresponding to the recessed portion so as to constitute an outward face, in the vehicle width direction, of the closed cross section of the frame member which is located in front of said position corresponding to the recessed portion, and a front end of said outer panel is joined to said side sill.

4. The rear vehicle-body structure of claim 2, wherein said frame member is provided with an outer panel which constitutes an outward face, in the vehicle width direction, of said outward-side closed cross section, said outer panel forwardly extends continuously from said position corresponding to the recessed portion so as to constitute an outward face, in the vehicle width direction, of the closed cross section of the frame member which is located in front of said position corresponding to the recessed portion, and a front end of said outer panel is joined to said side sill.

5. The rear vehicle-body structure of claim 3, wherein a ridgeline which extends continuously over a range from said position corresponding to the recessed portion to a joint portion of said outer panel to the side sill is formed at the outer panel.

6. The rear vehicle-body structure of claim 4, wherein a ridgeline which extends continuously over a range from said position corresponding to the recessed portion to a joint portion of said outer panel to the side sill is formed at the outer panel.

7. The rear vehicle-body structure of claim 1, wherein a suspension-component attachment portion where a suspension component of the rear suspension is attached is provided between a joint portion of said frame member to said side sill and said position corresponding to the recessed portion.

8. The rear vehicle-body structure of claim 2, wherein a suspension-component attachment portion where a suspension component of the rear suspension is attached is provided between a joint portion of said frame member to said side sill and said position corresponding to the recessed portion.

9. The rear vehicle-body structure of claim 3, wherein a suspension-component attachment portion where a suspension component of the rear suspension is attached is provided between a joint portion of said frame member to said side sill and said position corresponding to the recessed portion.

10. The rear vehicle-body structure of claim 4, wherein a suspension-component attachment portion where a suspension component of the rear suspension is attached is provided between a joint portion of said frame member to said side sill and said position corresponding to the recessed portion.

11. The rear vehicle-body structure of claim 5, wherein a suspension-component attachment portion where a suspension component of the rear suspension is attached is provided between a joint portion of said frame member to said side sill and said position corresponding to the recessed portion.

12. The rear vehicle-body structure of claim 6, wherein a suspension-component attachment portion where a suspension component of the rear suspension is attached is provided between a joint portion of said frame member to said side sill and said position corresponding to the recessed portion.

* * * * *